US008995994B2

(12) United States Patent
Dowds et al.

(10) Patent No.: US 8,995,994 B2
(45) Date of Patent: Mar. 31, 2015

(54) ROUTING COMMUNICATIONS BETWEEN TELECOMMUNICATIONS NETWORKS

(75) Inventors: Mark Dowds, Swindon (GB); Paul Davey, Newbury (GB); Ian Maxwell, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 2200 days.

(21) Appl. No.: 11/994,296

(22) PCT Filed: Jun. 30, 2006
(Under 37 CFR 1.47)

(86) PCT No.: PCT/GB2006/002433
§ 371 (c)(1),
(2), (4) Date: Jan. 28, 2013

(87) PCT Pub. No.: WO2007/003911
PCT Pub. Date: Jan. 11, 2007

(65) Prior Publication Data
US 2013/0203408 A1 Aug. 8, 2013

(30) Foreign Application Priority Data
Jun. 30, 2005 (GB) .................................. 0513416.8

(51) Int. Cl.
*H04W 4/00* (2009.01)
*H04W 8/02* (2009.01)
(Continued)

(52) U.S. Cl.
CPC . *H04W 8/02* (2013.01); *H04W 8/06* (2013.01)
USPC .................. 455/432.1; 455/432.2; 455/432.3; 455/433; 455/435.1; 455/435.2; 455/435.3; 455/436

(58) Field of Classification Search
CPC ....................................................... H04W 4/00
USPC ....................................................... 455/432.1
See application file for complete search history.

(56) References Cited

U.S. PATENT DOCUMENTS

| 6,618,590 | B1 | 9/2003 | Howe |
| 6,633,755 | B1 | 10/2003 | Haumont |

(Continued)

FOREIGN PATENT DOCUMENTS

| EP | 1071268 | 1/2001 |
| GB | 2396771 A | 6/2004 |
| WO | WO 00/07403 | 2/2000 |

OTHER PUBLICATIONS

Amoakoh Gyasi-Agyei: "Mobile IP-DECT Internetworking Architecture Supporting IMT-2000 Applications" IEEE Network, IEEE Service Center, New York, NY, US, vol. 15, No. 6, Nov. 2001, pp. 10-22.
(Continued)

*Primary Examiner* — Huy C Ho
(74) *Attorney, Agent, or Firm* — Workman Nydegger

(57) ABSTRACT

A telecommunications system includes a first (home) mobile telecommunications network A5 second (roamed) mobile telecommunications network B and a third (virtual) mobile telecommunications network C. The virtual network C does not have its own radio access network but uses the radio access network of network B in accordance with a commercial contract between networks B and C. Network C is a MVNO. When a mobile telecommunications device that has network A as its home network roams to network B, the mobile telecommunications device initially registers with network B as the roamed network. Conventionally, communications between network A and network B would be transmitted via a fixed communication link (25) (such as a leased line). However, in the embodiment described, the network A transmits a command to the mobile telecommunications device, instructing that device to de-register from network B and to re-register with virtual network C. The home network A and the virtual network C include IP routing servers (29, 29C) which enable voice over IP calls to be routed between the home network A and the virtual network C via the Internet (31). The calls can subsequently be routed from the virtual network C to the mobile device via the radio access network on network B. In this way, use of the fixed communication link (25) between network A and network B is reduced, thereby potentially reducing the cost of making and receiving calls while roaming.

20 Claims, 6 Drawing Sheets

(51) Int. Cl.
*H04W 8/06* (2009.01)
*H04W 36/00* (2009.01)

(56) References Cited

U.S. PATENT DOCUMENTS

| | | | |
|---|---|---|---|
| 6,950,876 B2 * | 9/2005 | Bright et al. | 709/230 |
| 7,284,057 B2 * | 10/2007 | Kulkarni et al. | 709/227 |
| 2003/0117954 A1 | 6/2003 | De Neve et al. | |
| 2004/0142689 A1 | 7/2004 | Boda | |
| 2006/0258349 A1 * | 11/2006 | Rager et al. | 455/433 |

OTHER PUBLICATIONS

Rahman M et al: "QoS for inter-WLAN IP mobility with high speed accessed network server" Wireless Communications and Networking Conference, 2005 IEEE New Orleans, LA, US, Mar. 13-17, 2005, Piscataway, NJ, US, IEEE, Mar. 13, 2005, pp. 1564-1569.

United Kingdom Patent Office Search Report for GB0513416.8 dated Oct. 28, 2005.

* cited by examiner

ROUTING COMMUNICATIONS BETWEEN TELECOMMUNICATIONS NETWORKS

TECHNICAL FIELD

The present invention relates to a telecommunications system including a plurality of mobile telecommunications networks and to a method of operating such a telecommunications system. A first of the telecommunications networks may be the "home" mobile telecommunications network with which a mobile terminal is usually registered. A second of the mobile telecommunications networks may be a "roamed" mobile telecommunications network with which the mobile device may be temporarily registered, a fixed communication link existing between the home network and the roamed network in order to allow data exchange therebetween. A third of the mobile telecommunications networks may be a "virtual" mobile telecommunications network operated by a Mobile Virtual Network Operator (MVNO). Such a virtual mobile telecommunications network does not include its own radio access network, but instead relies on the radio access network of another mobile telecommunications network (for example that of the roamed mobile telecommunications network) to wirelessly communicate with the mobile device when the mobile device is temporarily registered with the virtual mobile telecommunications network.

BACKGROUND ART

It is known that a subscriber of a GSM, GPRS or UMTS mobile telecommunications network (their "home network") may use their mobile device when located in the coverage area of a roamed network. An agreement exists between that home network and the roamed network which allows data to be shared therebetween in order to allow appropriate routing of the calls and so that the user of the mobile device can be levied a charge in dependence upon costs incurred by both the home network and the roamed network in handling the call. A fixed communication link, typically a leased telephone line, connects the home network and the roamed network and calls between the networks are routed along this link. The use of such a communication link incurs significant costs for the home network and/or the roamed network, and these are passed on to the user of the mobile device. It is partly these costs that generally make both receiving and making calls while a mobile device is roaming considerably more expensive than other types of call.

SUMMARY OF THE INVENTION

It is an object of the embodiment of the present invention to provide an arrangement by which the use of the fixed communication link between a home network and a roam network is reduced, thereby potentially lowering the cost of making and receiving calls when a mobile device is roaming.

According to a first aspect of the present invention, there is provided a telecommunications system including a first mobile telecommunications network having a first radio access network and with which a mobile telecommunications device is initially registered to enable the mobile telecommunications device to communicate wirelessly with the first mobile telecommunications network using the first radio access network; a second mobile telecommunications network having a second radio access network and with which the mobile telecommunications device can be temporarily registered to enable the mobile telecommunications device to communicate wirelessly with the second mobile telecommunications network using the second radio access network, the first and second mobile telecommunications networks being connected together for communication therebetween by a communication link; and a third mobile telecommunications network with which the mobile telecommunications device can be temporarily registered and operable to communicate with the mobile telecommunications device using the second radio access network; the arrangement being such that, when the mobile device registers temporarily with the second mobile telecommunications network, a notification is sent via the communication link to the first mobile telecommunications network, in response to which the first mobile telecommunications network causes the mobile telecommunications device to register with the third mobile telecommunications network to enable communication between the first mobile telecommunications network and the mobile telecommunications device, said communication being routed between the first mobile telecommunications network and the third mobile telecommunications network by a connection including the Internet but not including the communication link.

The connection may be a voice over IP connection.

According to a second aspect of the present invention, there is provided a telecommunications system including a first mobile telecommunications network having a first radio access network and with which a mobile telecommunications device is initially registered to enable the mobile telecommunications device to communicate wirelessly with the first mobile telecommunications network using the first radio access network; a second mobile telecommunications network having a second radio access network and with which the mobile telecommunications device can be temporarily registered to enable the mobile telecommunications device to communicate wirelessly with the second mobile telecommunications network using the second radio access network, the first and second mobile telecommunications networks being connected together for communication therebetween by a communication link; and a third mobile telecommunications network with which the mobile telecommunications device can be temporarily registered and operable to communicate with the mobile telecommunications device using the second radio access network; the arrangement being such that, while the mobile device is registered temporarily with the third mobile telecommunications network, the mobile telecommunications device is operable to initiate communication between the first mobile telecommunications network and the mobile telecommunications device, said communication being routed between the first mobile telecommunications network and the third mobile telecommunications network by a voice over IP connection including the Internet but not including the communication link.

According to a third aspect of the present invention, there is provided a telecommunications system including a first mobile telecommunications network having a first radio access network and with which a mobile telecommunications device is initially registered to enable the mobile telecommunications device to communicate wirelessly with the first mobile telecommunications network using the first radio access network; a second mobile telecommunications network having a second radio access network and with which the mobile telecommunications device can be temporarily registered to enable the mobile telecommunications device to communicate wirelessly with the second mobile telecommunications network using the second radio access network, the first and second mobile telecommunications networks being connected together for communication therebetween by a communication link; and a third mobile telecommunications network with which the mobile telecommunications device can be temporarily registered and operable to communicate with the mobile telecommunications device using the second radio access network; the arrangement being such that, while the mobile telecommunications device is registered temporarily with the third mobile telecommunications network, the first mobile telecommunications network is operable to transmit a command to the mobile telecommunications device via the communication link to cause the mobile telecommunications device to initiate a data processing application thereon.

The present invention also relates to methods of operating the telecommunications system defined above, as specified in the independent method claims hereof.

In the embodiment the first telecommunications network is the home network with which the mobile telecommunications device is permanently or semi-permanently registered. The second mobile telecommunications network is a network in a different geographical location that has a roaming agreement with the first network. The first and second networks have a radio access network allowing wireless communication with a mobile telecommunications device within the geographical area covered by the respective network. In the conventional manner, the first and second mobile telecommunications network are connected together by a communication link. The communication link may be a fixed communication link such as, but not necessarily, a leased telephone line. The communication link may also comprise the Internet. Calls made by mobile terminal when roaming in the roamed network are routed via this fixed telecommunications link in the prior art. In accordance with a feature of the embodiment, the use of this fixed telephone link is reduced by transmitting telephone calls using a voice over Internet protocol connection.

In the embodiment, the third mobile telecommunications network is a virtual network or MVNO. Such a network does not have its own radio access network, but instead, by agreement, uses radio access network of the roamed network. When the mobile telecommunication device registers temporarily with the roamed network, in response to this the first network causes the mobile telecommunications device to de-register from the roamed network and to re-register with the virtual network. The home network and the virtual network have IP routing servers. This allows a voice over IP call to be established between the home and virtual networks to allow calls to be routed therebetween. The calls can be routed onwardly to the mobile telecommunications device using the radio access network of the roamed network B. In this manner, the call is not transmitted using the fixed communication link, and the costs of the call may potentially be reduced.

BRIEF DESCRIPTION OF THE DRAWINGS

For a better understanding of the present invention, an embodiment will now be described by way of example and with reference to the accompanying drawings in which:—

In the drawings like elements are generally designated with the same reference numeral.

DETAILED DESCRIPTION OF EMBODIMENT OF THE INVENTION

Figure 1:
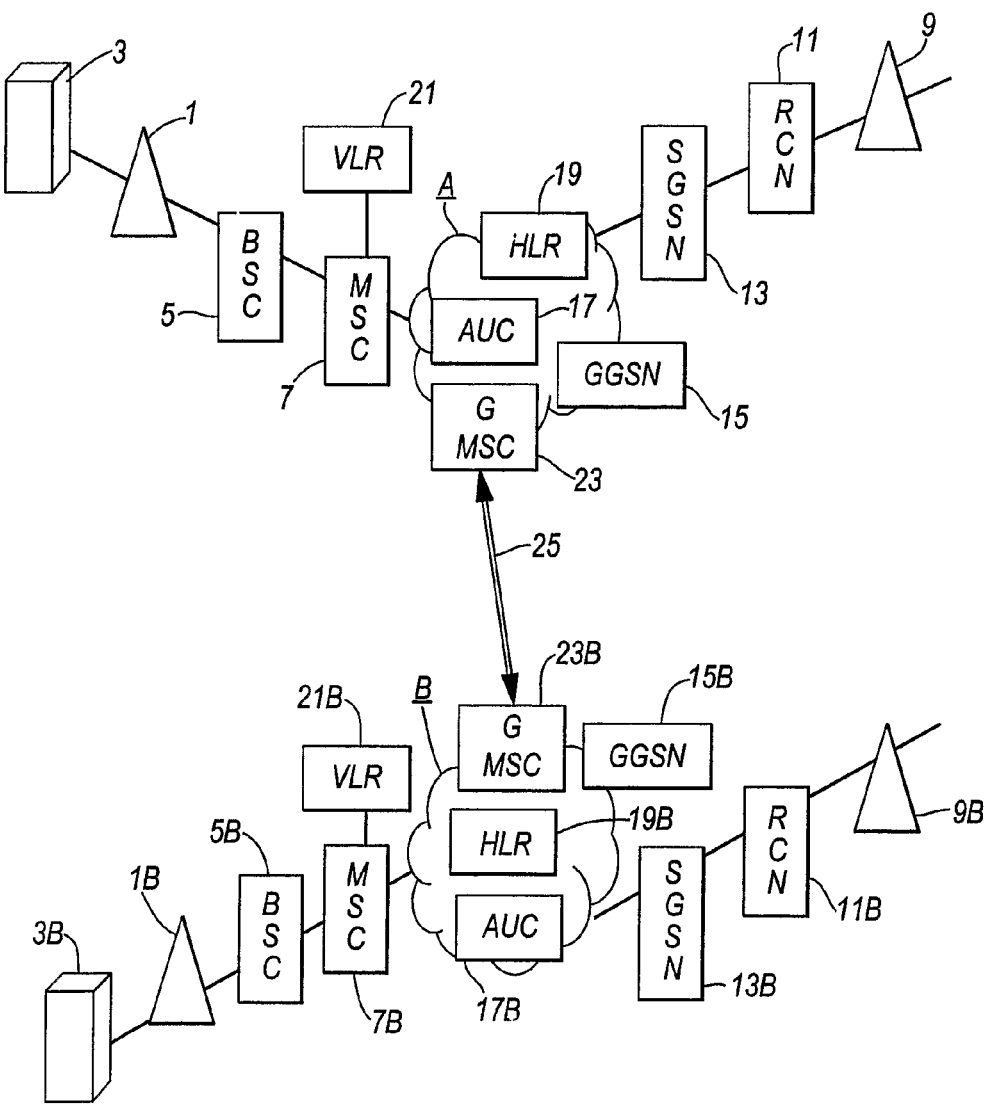
FIG. 1 is a diagrammatic drawing of a home mobile telecommunications network and a roamed telecommunications network.

FIG. 1 diagrammatically explains the apparatus of two GSM/GPRS/UMTS mobile or cellular telecommunications networks between which there is a roaming agreement. The networks comprise "home network" A and "roamed network" B.

Network A has a number of base transceiver stations (BTSs) 1 (one of which is shown). Each base transceiver station corresponds to a respective cell of the mobile telecommunications network and wirelessly receives communications from and transmits communications to a mobile device ("mobile station", MS) 3 in that cell by radio. The base transceiver station 1 is controlled by a base station controller (BSC) 5. The BSC 5 may control more than one base transceiver station 1. Together, the base transceiver station 1 and the BSC 5 are referred to as a base station (BS). Base stations are arranged in groups and each group of base stations is controlled by a mobile switching centre (MSC), such as MSC 7.

The base transceiver station 1, BSC 5 and MSC 7 are used to route calls in the circuit switched domain. In order to route calls in the packet switched domain, the network A may comprise a plurality of Node Bs 9 (only one of which is shown), each of which is associated with a radio network controller (RNC) 11. The node B 9 and the RNC 11 are controlled by serving GPRS support node (SGSN) 13. In the packet switched domain, the node B 9, RNC 11 and SGSN 13, broadly perform a function corresponding respectively to the base transceiver station 1, BSC 5 and MSC 7 in the circuit switched domain. It should be understood that, although only one of each of the above components is illustrated in FIG. 1, in practice, the mobile telecommunications network will comprise a multiplicity of these elements.

The network A also includes a gateway GPRS support node (GGSN 15) which enables IP-based communications with other networks.

The MS 3 (and each other mobile device that has a subscription with the network A) is provided with a subscriber identity module (SIM/USIM). During the manufacturing process of each SIM, authentication information is stored thereon under control of the mobile telecommunications network A. The mobile telecommunications network A itself stores details of each of the SIMs issued under its control. In operation of the network A, the MS 3 is authenticated (for example, when the user activates the terminal in the network with a view to making or receiving calls) via the network A by sending a challenge to the terminal 3 incorporating a SIM, in response to which the SIM calculates a reply (dependent on the predetermined information held on the SIM—typically an authentication algorithm and a unique key Ki) and transmits it back to the network A. The mobile telecommunications network A includes an authentication processor (AUC) 17 which generates the challenge and receives the reply from the MS 3. Using information pre-stored concerning the content of the relevant SIM, the AUC 17 calculates the expected value of the reply from the SIM/MS 3. If the reply received matches the expected calculated reply, the SIM and the associated MS3 are considered to be authenticated.

The SIM used by the MS 3 (and any other devices which have a subscription in the network A) may be a SIM or USIM of the type defined in the GSM or UMTS standard specifications, or may be a simulation of a SIM—that is, software or hardware that performs a function corresponding to that of the SIM. The SIM may be in accordance with the arrangements disclosed in WO-A-2004 036513.

In addition to authentication information, the SIM is pre-programmed with a unique identification number, the International Mobile Subscriber Identity (IMSI) which is not visible on the SIM and is not known to the subscriber. The subscriber is of course also issued with a publicly known telephone number, that is the subscriber's telephone number, by means of which calls to that subscriber are initiated by callers. This number is the MSISDN (Mobile Station International ISDN Number).

The network A includes a home location register (HLR) 19 which, for each subscriber to the network A, stores the IMSI and the corresponding MSISDN together with other subscriber data. When a subscriber activates MS 3 in the network A, the MS 3 transmits the IMSI from the SIM to the base transceiver station 1, and from there to the BSC 5 and thence to the MSC 7. The MSC 7 then accesses an appropriate location in the HLR 19 and extracts the corresponding subscriber MSISDN and other subscriber data from the appropriate storage location, and stores it temporarily in a visitor location register (VLR) 21 associated with the MSC 7. In this way, therefore, the particular subscriber is effectively registered with the particular MSC (MSC 7), the subscriber's information being temporarily stored in the VLR (VLR 21) associated with that MSC.

Each of the MSCs of the network A has a respective VLR associated with it and operates in the same way as already described when a subscriber activates their MS in one of the cells corresponding to one of the base stations controlled by that MSC.

When the subscriber wishes to make a call using MS 3, having already registered with the network A using the SIM coupled to the MS 3 in the manner described above, the subscriber enters the telephone number of the called party in the usual way. This information is received by the base transceiver station 1 and subsequently by the base station controller 5, and the call is then routed to the called party via the MSC 7. By means of the information held in the VLR 21, MSC 7 can associate the call with a particular subscriber and thus record information for charging purposes.

Similarly, when a calling party (whether a subscriber within the network or outside it) makes a call for the subscriber holding MS 3, the MSC 7 is able to route this call to the MS 3 via the BSC 5 and base transceiver station 1, using the information relating to that subscriber and to MS 3 which is temporarily stored in VLR 21.

The foregoing is merely a simplified description of the operation of a subscriber's MS 3 when in the subscriber's home network. The home network is the network with which the subscriber is generally permanently registered, although the home network may be changed periodically, for example as disclosed in WO-A-03 013173 ("Extended Roaming"). However, typically the subscriber's SIM will be permanently or semi-permanently registered with the home network. The subscriber will have a contract with the home network (possibly via an intermediary) for the supply of telecommunication services. The home network includes details of the subscriber's subscription status and includes facilities for determining whether the status is such that mobile telecommunications services should be offered to the subscriber. For example, if payment of the subscriber's account is overdue, telecommunications services may be suspended.

In addition to the home network A, FIG. 1 shows a roamed network B. Items in roamed network B corresponding to those in home network A are similarly referenced but with the suffix "B". Of course, the network B is likely to have a different arrangement and number of MSCs, etc. but generally operates in the same way as network A.

As explained above, for a subscriber of home network A, the respective IMSI and MSISDN and other relevant data particular to that subscriber are stored in the HLR 19. If that subscriber now roams to roamed network B and activates a mobile terminal such as MS 3B in that network using their SIM, the procedure described above is substantially repeated.

Figure 4:
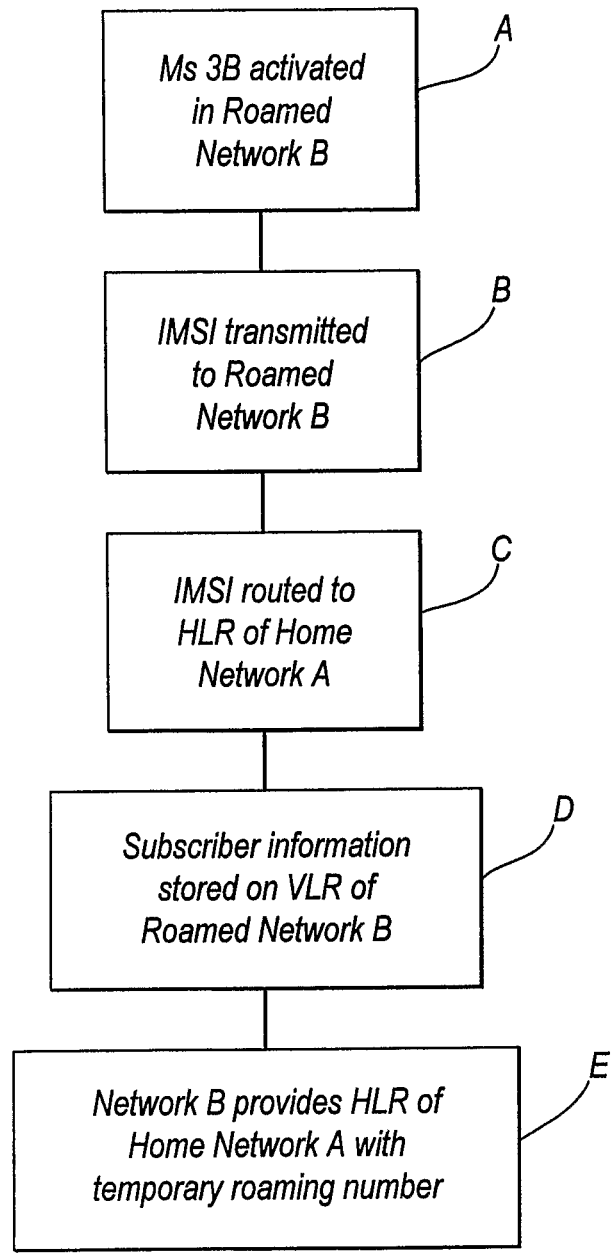
FIG. 4 shows a flow chart of the steps taken when a mobile device is activated in a roamed mobile telecommunications network.

Thus, the subscriber inserts their SIM card into the card reader of MS 3B and activates the MS 3B (step A of FIG. 4), the MS 3B transmits the IMSI from the card to the local base transceiver station 1A, BSC 5A and from there to MSC 7A (step B). However, MSC 7A will now recognise, from the structure of the IMSI, that the subscriber is not a subscriber to network B but is a subscriber to network A. (For example, the MSC 7A will detect that the Mobile Network Code (MNC) which forms part of the IMSI does not correspond to the MNC of the network B.) This causes the MSC 7B to access the HLR 19 of network A instead of HLR 19B of network B (step C). This accessing by MSC 7B is performed via the gateway MSC (GMSC) 23B of the network B. GMSC 23B of network B is connected to corresponding GMSC 23 of network A by a fixed communication link 25. Such fixed communication link 25 may comprise a leased fixed telephone line—for example, using the PSTN.

It should be appreciated that such a fixed communication link 25 will typically not be owned by either the home network A or the roamed network B (the network operator is typically providing mobile or wireless telecommunication services rather than fixed or cable telecommunications services). The fixed communication link 25 may typically be leased from a third party and will require a payment to that third party for its use. Typically, the roamed telecommunications network B will be located in a different country to the home telecommunications network A. The cost of retaining and using the fixed communication link may be significant, and contributes to the relatively high call charges incurred when a mobile device is roaming. As indicated above, it is an object of the embodiment of the invention to be described below to reduce the use of such a fixed communication link 25. However, in order that the advantages of the embodiment can be understood in context, the description of the conventional roaming arrangement continues briefly below.

When the interconnection between the MSC 7B and the HLR 19 is established (via the fixed communications link 25), the subscriber's information, including the relevant MSISDN and other subscriber data, will be accessed and temporarily stored in the VLR 21B associated with the MSC 7B (step D). Also via the fixed communication link 25, the HLR 19 of network A interrogates network B to request a "roaming number" (step E). This is in effect a temporary telephone number for the subscriber, being a number appropriate to network B. This roaming number can now be used to route a calling party's call to network B and thence to MS 3B. The calling party would of course not be aware of this roaming number or of the transferring process. All this information is thus ready for use in processing calls to or from the MS 3B.

Conventionally, when a calling party wishes to make a call to the MS 3B, the call would initially be routed to network A (because this network would be the network identified with the subscriber's publicly known telephone number (MSISDN) which the calling party would use). The HLR 19 of network A is then interrogated and would thus produce information that a copy of the subscriber's data was temporarily stored in VLR 21B of network B, thus indicating, of course, that the subscriber had roamed to network B. The temporary number provided by network B and stored in HLR 19 of network A is then used to route the call to MS 3B.

Any charging information associated with any such calls can then be associated with the subscriber information in VLR 21B of network B and eventually transmitted back to HLR 19 of network A and then billed to the subscriber in accordance with the contract that the subscriber has with network A.

The networks A and B provide a radio access network (RAN) by means of base transceiver stations 1,1B and BSCs 5,5B, and corresponding node Bs 9,9B and RNCs 11,11B. The radio access networks enable wireless communication with mobile devices in the geographical area covered by the respective networks.

Figure 2:
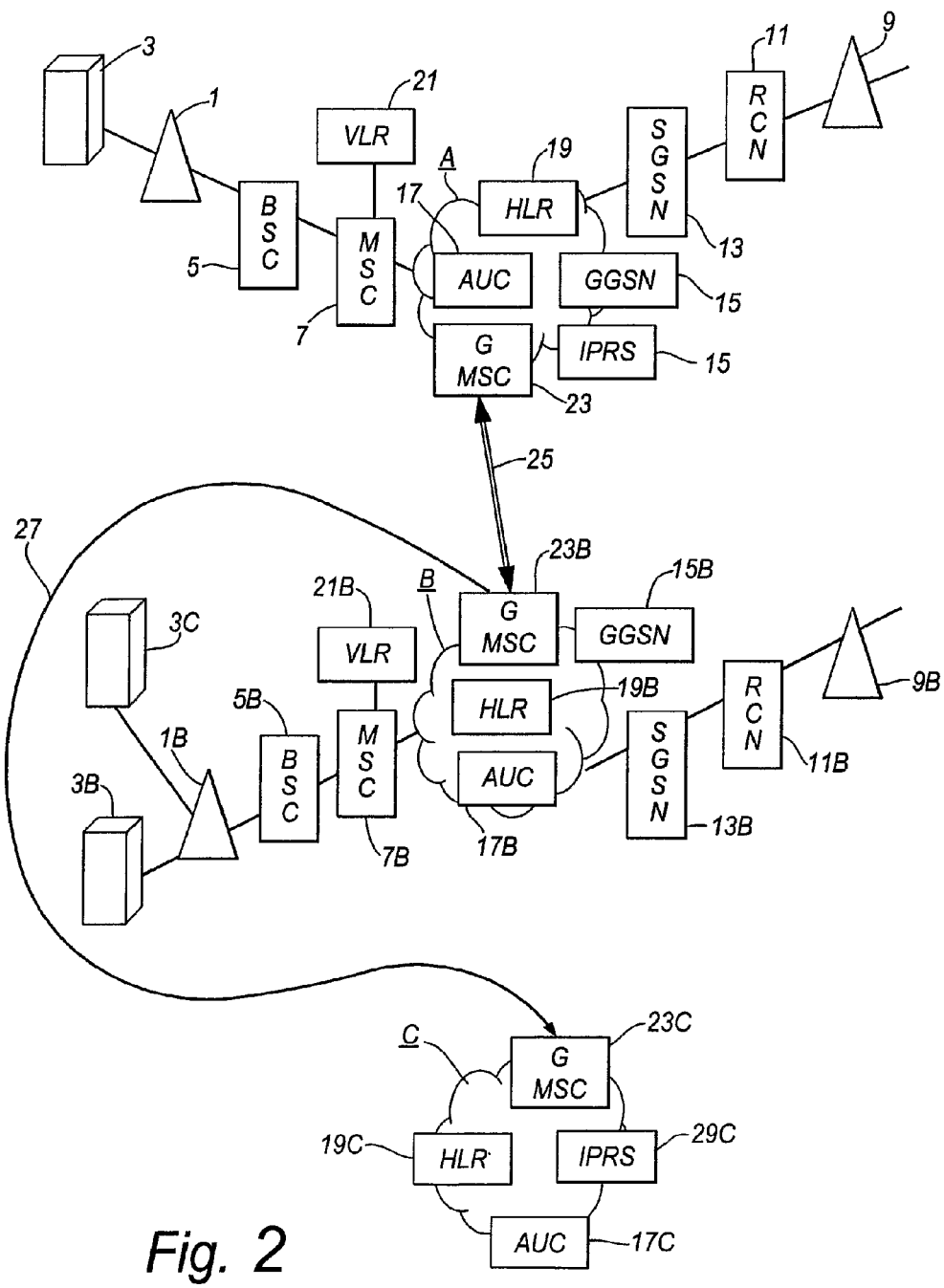
FIG. 2 is a diagrammatic drawing of a home mobile telecommunications network, a roamed mobile telecommunications network and a virtual mobile telecommunications network.

A new class of telecommunications network has recently come into existence, referred to as a "virtual network". Such virtual networks are said to be operated by so-called Mobile Virtual Network Operators (MVNOs). Virtual networks do not have their own radio access networks but include some or all of the other components of a "conventional" mobile telecommunications network (such as network A and network B). Such a virtual mobile telecommunications network C is shown in FIG. 2. The virtual network C has an agreement with network B to use the radio access network of network B in order to wirelessly route calls to the subscribers of network C. Details of the subscribers of network C are stored in the HLR 19C of network C in the manner similar to a normal network as described above. Also, the virtual network C will provide its subscribers with a SIM that allows the subscribers mobile device to be registered with the network C. The SIM will include an IMSI in the manner described above. That IMSI will include a Mobile Network Code (MNC) that identifies the SIM as being registered with virtual network C. A commercial contract between network C and network B allows the subscribers of network C to use the radio access network of network B on payment for such access by network C.

The virtual network C includes, inter alia, an authentication server (AUC) 17C, HLR 19C and GMSC 23C.

The GMSC 23C of network C allows the network C to connect to the PSTN and also to the network B. Subscribers to the network C will have an MSISDN for allowing calls to be routed to the GMSC 23C.

MS 3C has a SIM associated with it which is issued under the control of virtual network C, and the user of MS 3C is therefore a subscriber of network 3C. As explained above, virtual network C has no radio access network of its own. A commercial contract between virtual network C and network B allows subscribers of virtual network C to use the radio access network of network B. When the subscriber activates MS 3C within the radio access network of network B, the MS 3C transmits the IMSI from its SIM to the local base transceiver station 1B, and from there to the relevant BSC 5B and thence to the appropriate MSC 7B. The MSC 7B recognises, from the structure of the IMSI (for example from the MNC) that the subscriber is not a subscriber to network B but is a subscriber to virtual network C. The MSC 7B will access HLR 19C of the virtual network C, via GMSC 23B and GMSC 23C, and the link layer between them 27. The subscriber's information, including the relevant MSISDN and other subscriber data, will be accessed from HLR 19C and temporarily stored in the VLR 21B associated with the MSC 7B. This information is thus ready for use in processing calls to or from MS 3C. Any charging information associated with any such calls can then be associated with the subscriber information in VLR 21B and eventually transmitted back to HLR 19C of the virtual network C and then billed to the subscriber.

If a calling party wishes to call the subscriber using MS 3C, the call would initially be routed to virtual network C (because this network would be the network identified by the subscribers MSISDN, which the calling party would use). The HLR 19C would then be interrogated and would produce information that a copy of the subscriber's data was temporarily stored in VLR 21B, thus indicating, of course, that the subscriber was being served via the part of the radio access network of network B associated with the VLR 21B. The call can then be routed to the MS 3C. The call is routed from GMSC 23C to GMSC 23B. From there, the call is routed to MSC 7B, to BSC 5B, to base transceiver station 1B and from there wirelessly to MS 3C.

It will be appreciated that the arrangements (for example steps A to D of the flow chart of FIG. 4) for routing calls to a subscriber of a virtual mobile network C using the radio access network of network B are similar to the arrangements for routing calls of a subscriber of network A when roaming in network B.

In the embodiment of the invention now to be described, in addition to the commercial contract between the virtual network C and the network B, there is also an association between the virtual network C and the network A. For example, the network A might own the virtual network C. By virtue of the association between network A and network C, there may in fact be a commercial contract between network B and network A, rather than network B and network C. IP the embodiment the radio access network of network A provides wireless coverage in the United Kingdom. The radio access network of network B provides wireless coverage in France. A roaming agreement exists between network A and network B, and data allowing calls between roaming mobile terminals to the home network may be transmitted in the conventional manner by fixed communication link 25. The virtual network C, as explained above, uses a radio access network of network B, and therefore also has wireless coverage in France.

In this embodiment, the arrangement between the network A and the virtual network C is such that the user of mobile device MS 3D (FIG. 3) has a subscription with network A. However, the MS 3D is also able to temporarily register with virtual network C (as well as with roamed network B, by virtue of the conventional roaming agreement between networks A and B).

In accordance with the embodiment, the steps taken when the MS 3D is activated within the radio access network of network B will now be described. One object of the steps described is to reduce the use of the fixed communication link 25 between the networks A and B, whilst enabling the subscriber of MS 3D to obtain wireless coverage when in the radio access area of network B.

When MS 3D is initially activated in the radio access network of network B, the MS 3D is registered with the relevant VLR 21B of network B as if it was conventionally roaming in network B. The network B provides the HLR 19A of network A with a temporary roaming number in order to allow home network A to route calls to MS 3D. These steps A to E have already been described with reference to FIG. 4.

Figure 5:
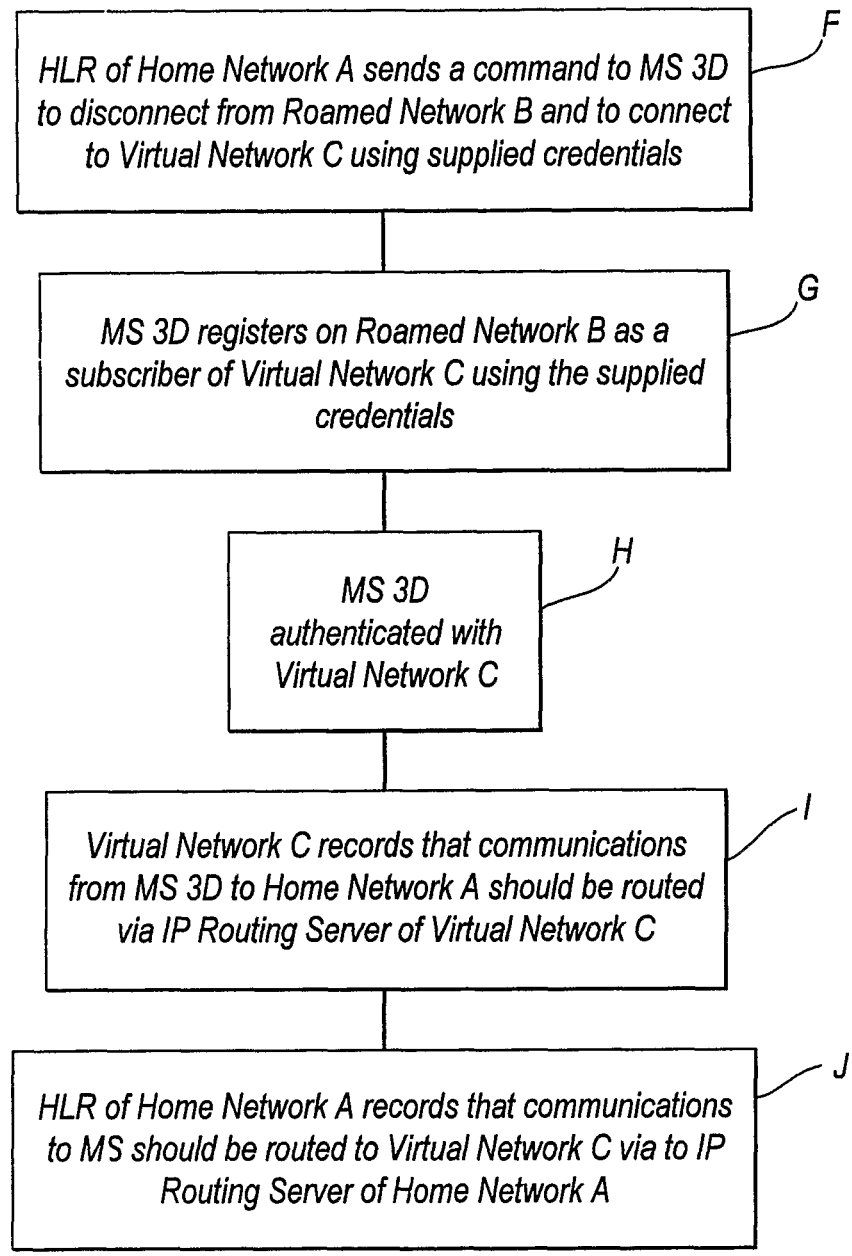
FIG. 5 is a flow chart showing the steps taken when a virtual mobile telecommunications network under the control of the home mobile telecommunications network is associated with the roamed mobile telecommunications network such that it can communicate wirelessly with the mobile device using the radio access network of the roamed mobile telecommunications network, in accordance with an aspect of the present invention.

In accordance with the embodiment, when the HLR 19 of network A receives the information from network B (step E of FIG. 4), the HLR transmits to the MS 3D a command for the MS 3D to disconnect from the roamed network B and to connect to the virtual network C, using credentials supplied with the disconnect command. This is step F of the flow chart of FIG. 5. MS 3D, upon receiving the disconnect command, disconnects from the roamed network B (that is, MS 3B de-registers as a device roaming in network B) and uses the supplied credentials to register with the network B as a subscriber of virtual network C. That is, the MSC 7B will receive data from the MS 3D (possibly a temporary IMSI), which will cause the MSC 7B to recognise that the MS 3D should be registered with virtual network C. Therefore, MSC 7B will then access HLR 19C of virtual network C using GMSC 23B, GMSC 23C and the link therebetween 27. The information of the subscription of MS 3D, including the relevant MSISDN and other subscriber data, will be accessed and temporarily stored in VLR 21B associated with MSC 7B. The credentials supplied by the HLR 19 of network A include a temporary telephone number that will allow calls to be routed to the MS 3D via the virtual network C. That temporary number will be a "local" telephone number for the geographical area served by the virtual network C (that is, the geographical area served by the radio access network of network B). In the embodiment being described, the telephone number will be a national French telephone number that can be called using the International dialing code "+33". This is step G of FIG. 5.

MS 3D is then authenticated with the authentication server (AUC) 17C of virtual network C in the manner described above by means of a challenge and response data exchange but with the SIM of MS 3D. This is step H of FIG. 5.

In accordance with an important feature of the embodiment, the network A and the virtual network C are provided with respective IP Router Servers (IPRs) 29A,29C. These allow internet protocol-based communication between the network A and the virtual network C via the Internet 31 (or any other IP-based network). At step I of FIG. 5 the network C records in the HLR 19C that calls between MS 3D and the home network A should be routed via the IP routing server 29C of network C. Similarly, the HLR 19A of network A records that communications to MS 3D should be routed to virtual network C via the IP routing server 29A of home network A—step J of FIG. 5.

Figure 3:
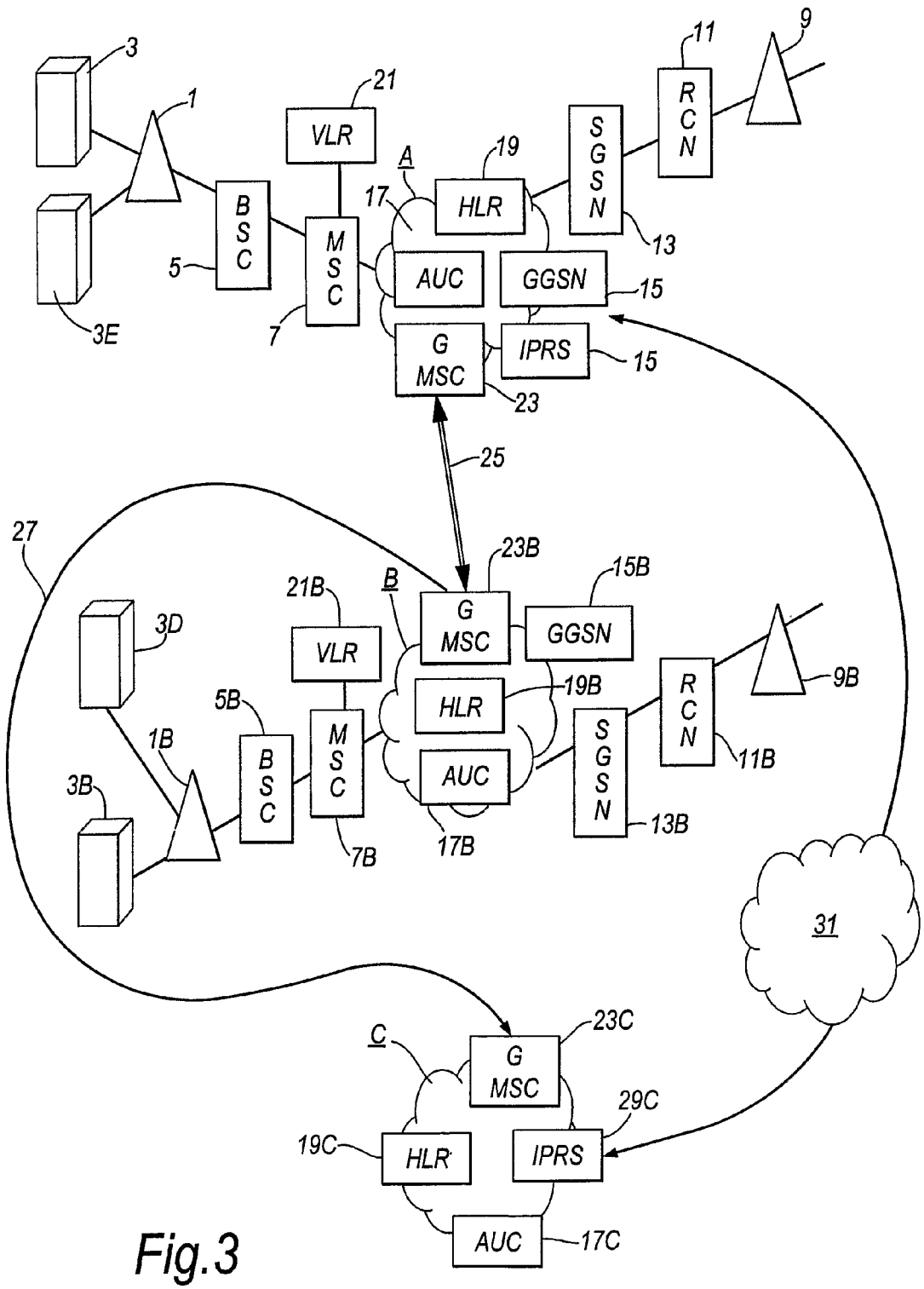
FIG. 3 is a diagrammatic drawing similar to FIG. 2 but showing an additional Voice over Internet Protocol (VoIP) communication channel established between the home mobile telecommunications network and the virtual telecommunications network.

The establishment of a call between MS 3D and MS 3E will now be described. MS 3E is shown in FIG. 3 as being served by base transceiver station 1A, BSC 3A and MSC 7 of network A. However, MS 3E could in fact be a fixed telecommunications device which communicates with the network A using the PSTN via GMSC 23.

Figure 6:
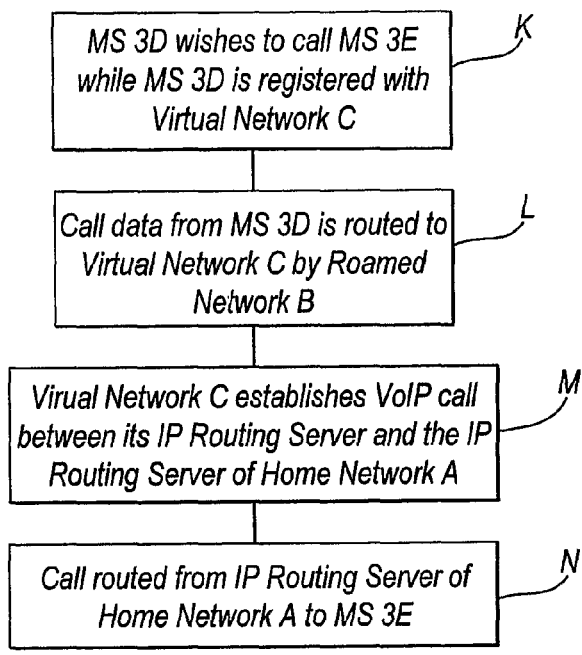
FIG. 6 is a flow chart showing the steps taken when the mobile device wishes to call a device connected to the home mobile telecommunications network.

In order to call MS 3E (step K of the flow chart of FIG. 6), the user of MS 3D enters the MSISDN of MS 3E. The MSISDN and associated data relating to MS 3D is transmitted wirelessly to the radio access network of network B, and from there to virtual network C via the connection 27 between GMSC 23B and GMSC 23C. The VLR 21B recognises from data provided by MS 3D that MS 3D is not a (direct) subscriber of network B. This causes the call to be routed to the network C using information stored in the VLR 21B when the MS 3D was initially registered with network B as a subscriber of virtual mobile network C. When the call data is received by network C (step L), the HLR 19C is consulted, including the record that communications from MS 3D should be routed to the home network A via IP routing server 29C. Signalling between the IP routing server 29C and the IP routing server 29, via the Internet 31, allows the establishment of a voice over internet protocol (VoIP) call to be established between the respective IP routing servers 29C,29 (step M). The voice data received by IP routing server 29 is then routed by network A to MS 3E via MSC 7, BSC 5 and base transceiver station 1 (step N), using information concerning MS 3E stored on HLR 19 (by virtue of the registration of MS 3E with network A). Alternatively, the call could be routed in the packet switched domain using SGSN 13, RNC 11 and node B9. If the recipient of the call is not a mobile device registered with network A, the call can be routed to the appropriate device from network A via the GMSC 23 of network A—for example, to a fixed telephone via the PSTN.

Figure 7:
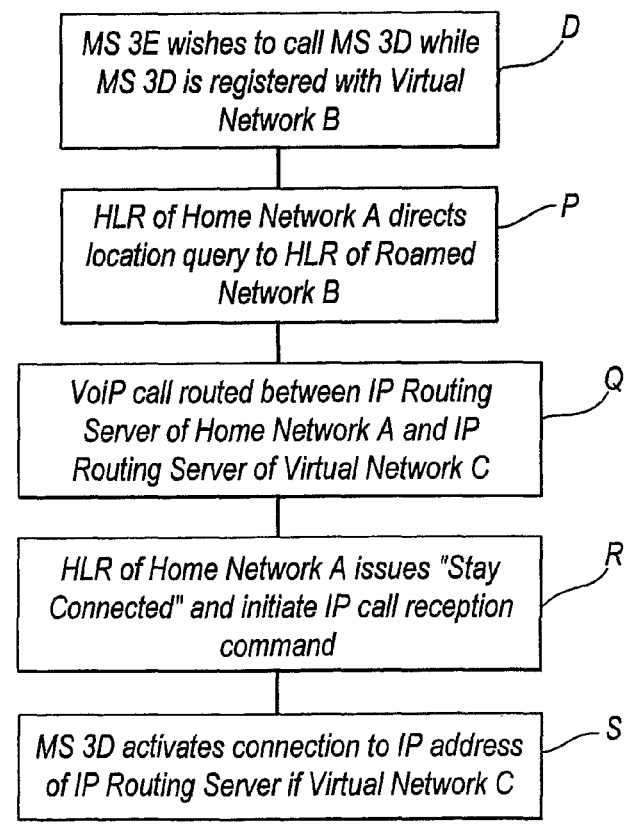
FIG. 7 is a flow chart showing the steps taken when the device connected to the home mobile telecommunications network wishes to call the mobile device.

The process by which the MS 3E makes a call to MS 3D while MS 3D is registered with virtual network C will now be described with reference to the flow chart of FIG. 7. MS 3E is a subscriber to network A, as described above. Also, as described above, it should be understood that the call for MS 3D could originate from another device, such as a fixed telephone connected to the network A via the PSTN. On initiation of the call from MS 3E (Step O), network A consults HLR 19, which responds indicating that a copy of the subscriber's data has been temporarily stored in VLR 21B, thus indicating that the subscriber has roamed to network B. The entry in HLR 19 of network A may be updated to indicate that the subscriber is now registered with virtual network C. The call will be transmitted using VoIP via IP routing server 29 of network A and IP routing server 29C of network C (Step Q). However, it is not possible for network C to initiate a call to MS 3D to deliver the voice data because the IP address of MS 3D will not be known. Therefore, delivery of the VoIP call to the MS 3D will not be possible. In order to overcome this problem, the HLR 19 of network A addresses a "stay connected" command and an "initiate IP call reception" command to MS 3D (step R). These commands are transmitted via GMSC 23 and GMSC 2.3B and fixed communication link 25 to the VLR 21B (this being the VLR with which MS 3D is recorded as registered by HLR 19 of network A). The commands are then passed to MS 3D via the radio access network of network D. When the "initiate IP call reception" command is received by the MS 3D, this activates the relevant application on the MS 3D, activating a connection to the IP address used by the IP routing server 29 of network A to transmit the VoIP call via the internet 31 to IP routing server 29C of network C.

The arrangements described above allow a VoIP connection to be established between the home network A and the virtual network C, thereby enabling MS 3D registered with network C, and using the radio access network of network B, to receive this data. The VoIP call is transmitted via the internet 31 and not via the fixed communication link 25, thereby significantly reducing the costs of transmitting the data, and thus potentially reducing the costs for making and receiving calls while roaming the network other than the subscriber's home network.

As the successful transmission of the VoIP call is dependent upon third parties not controlled by the home network A, it is possible that at times the service will be of poor quality or even unavailable. The facility for the MS 3D to make and receive calls while roaming by transmitting call data via the fixed communication link 25 is retained in order to allow this higher quality and more reliable link to be used when desired. In this manner, the user of MS 3D may be given the alternative of routing calls via VoIP or the fixed communication link 25, with possibly a higher fee being charged for use of the fixed communication link 25.

By transmitting the call using VoIP, it may be possible for the subscriber of MS 3D to not be charged for receiving calls while roaming. The charge rendered to the call initiator would be sufficient to cover the costs of the call to the roaming mobile terminal MS 3D.

The invention claimed is:

1. A telecommunications system comprising:
   a first mobile telecommunications network having a first radio access network with which a mobile telecommunications device is initially registered to enable the mobile telecommunications device to communicate wirelessly with the first mobile telecommunications network using the first radio access network;
   a second mobile telecommunications network having a second radio access network and with which the mobile telecommunications device can be temporarily registered to enable the mobile telecommunications device to communicate wirelessly with the second mobile telecommunications network using the second radio access network, the first and second mobile telecommunications networks being connected together for communication therebetween by a communication link; and
   a third mobile telecommunications network with which the mobile telecommunications device can be temporarily registered and operable to communicate with the mobile telecommunications device using the second radio access network;
   wherein when the mobile device registers temporarily with the second mobile telecommunications network, a notification is sent via the communication link to the first mobile telecommunications network, in response to which the first mobile telecommunications network causes the mobile telecommunications device to register with the third mobile telecommunications network to enable communication between the first mobile telecommunications network and the mobile telecommunications device, said communication being routed between the first mobile telecommunications network and the third mobile telecommunications network by a connection including the Internet but not including the communication link.

2. The system of claim 1, wherein the connection comprises a voice over IP connection.

3. The system of claim 1, wherein the first mobile telecommunications network is the home network with which the mobile telecommunications device is registered.

4. The system of claim 1, wherein the first mobile telecommunications network has a roaming agreement with the second mobile telecommunications network to enable the mobile telecommunications device to receive telecommunications services from the second mobile telecommunications network.

5. The system of claim 1, wherein the third mobile telecommunications network is a virtual mobile telecommunications network.

6. The system of claim 1, wherein the third mobile telecommunications network is commonly owned with the first mobile telecommunications network.

7. The system of claim 1, wherein the mobile telecommunications device is allocated a respective identifier when registered with each of said first, second and third mobile telecommunications networks.

8. The system of claim 1, wherein the communication link is a fixed communication link.

9. The system of claim 1, wherein the communication link is a fixed telephone line.

10. The system of claim 1, wherein data transmitted along the communication link is only data transmitted between the first and second mobile telecommunications networks.

11. The system of claim 1, wherein the first mobile telecommunications network and the second mobile telecommunications network include IP routing servers for routing voice over IP data packets comprising the speech data.

12. The system of claim 1, wherein the first and second mobile telecommunications networks comprise GSM, GPRS or UMTS mobile telecommunications networks.

13. A telecommunications system comprising:
    a first mobile telecommunications network having a first radio access network with which a mobile telecommunications device is initially registered to enable the mobile telecommunications device to communicate wirelessly with the first mobile telecommunications network using the first radio access network;
    a second mobile telecommunications network having a second radio access network and with which the mobile telecommunications device can be temporarily registered to enable the mobile telecommunications device to communicate wirelessly with the second mobile telecommunications network using the second radio access network, the first and second mobile telecommunications networks being connected together for communication therebetween by a communication link; and
    a third mobile telecommunications network with which the mobile telecommunications device can be temporarily registered and operable to communicate with the mobile telecommunications device using the second radio access network;
    wherein while the mobile telecommunications device is registered temporarily with the third mobile telecommunications network, the first mobile telecommunications network is operable to transmit a command to the mobile telecommunications device via the communication link to cause the mobile telecommunications device to initiate a data processing application thereon.

14. The system of claim 13, wherein the data processing application enables communication between the first mobile telecommunications network and the mobile telecommunications device, said communication being routed between the first mobile telecommunications network and the third mobile telecommunications network by a voice over IP connection including the Internet but not including the communication link.

15. The system of claim 13, wherein the third mobile telecommunications network is a virtual mobile telecommunications network.

16. The system of claim 13, wherein the third mobile telecommunications network is commonly owned with the first mobile telecommunications network.

17. A telecommunications system comprising:
    a first mobile telecommunications network having a first radio access network with which a mobile telecommunications device is initially registered to enable the mobile telecommunications device to communicate wirelessly with the first mobile telecommunications network using the first radio access network;
    a second mobile telecommunications network having a second radio access network and with which the mobile telecommunications device can be temporarily registered to enable the mobile telecommunications device to communicate wirelessly with the second mobile telecommunications network using the second radio access network, the first and second mobile telecommunications networks being connected together for communication therebetween by a communication link; and a third mobile telecommunications network with which the mobile telecommunications device can be temporarily registered and operable to communicate with the mobile telecommunications device using the second radio access network;

wherein while the mobile device is registered temporarily with the third mobile telecommunications network, the mobile telecommunications device is operable to initiate communication between the first mobile telecommunications network and the mobile telecommunications device, said communication being routed between the first mobile telecommunications network and the third mobile telecommunications network by a voice over IP connection including the Internet but not including the communication link.

18. The system of claim 17, wherein the first mobile telecommunications network is the home network with which the mobile telecommunications device is registered.

19. The system of claim 17, wherein the first mobile telecommunications network has a roaming agreement with the second mobile telecommunications network to enable the mobile telecommunications device to receive telecommunications services from the second mobile telecommunications network.

20. The system of claim 17, wherein the mobile telecommunications device is allocated a respective identifier when registered with each of said first, second and third mobile telecommunications networks.

* * * * *